Patented May 10, 1932

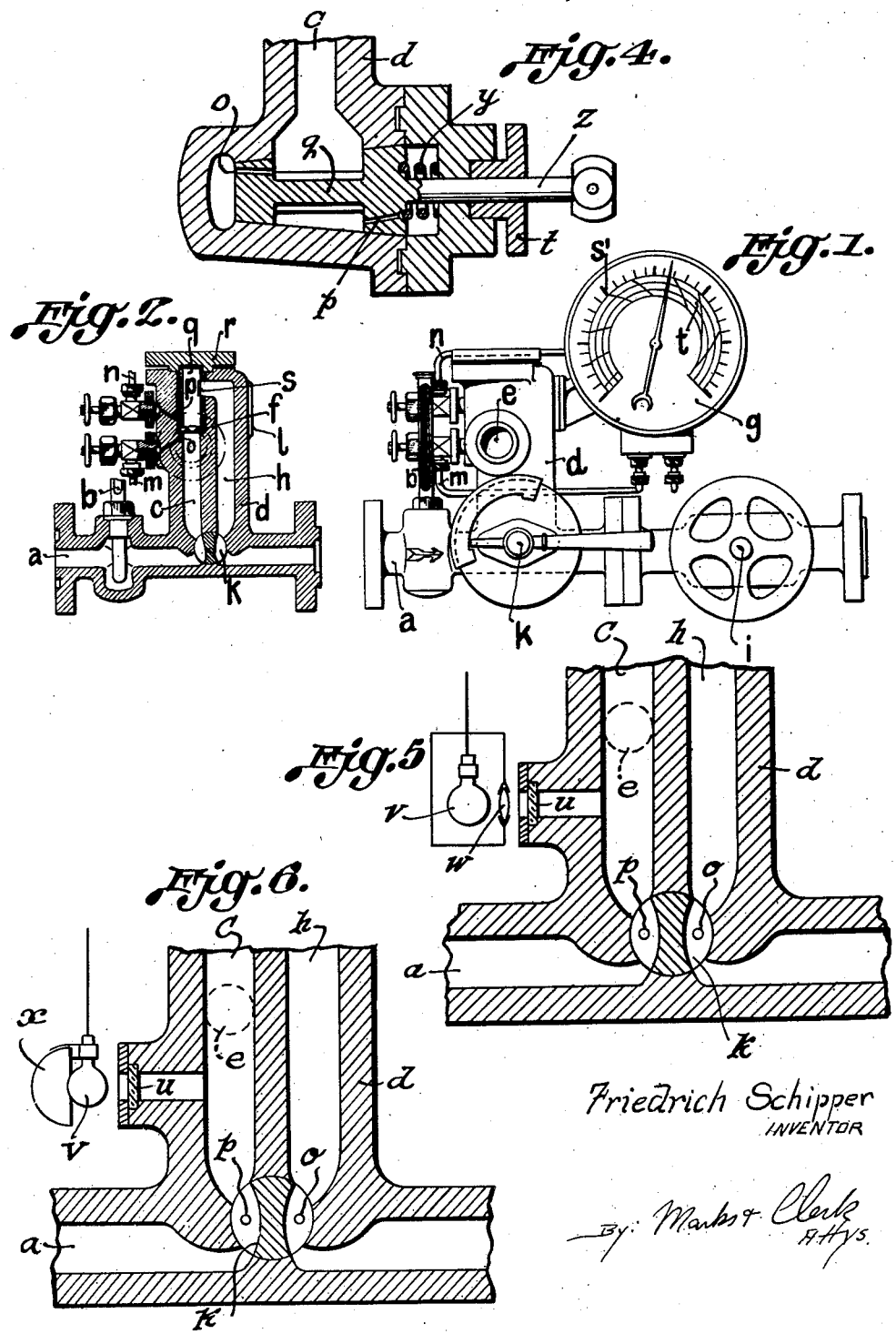

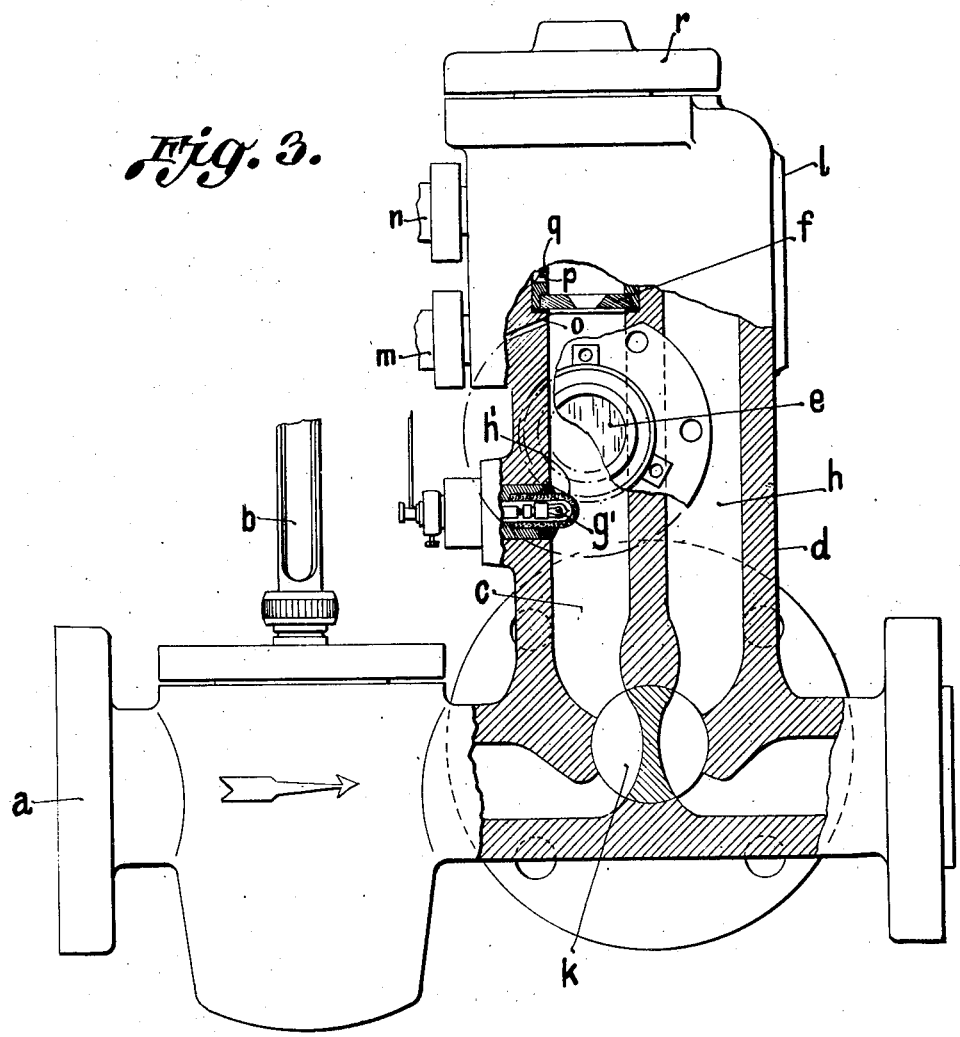

1,857,262

UNITED STATES PATENT OFFICE

FRIEDRICH SCHIPPER, OF WIESBADEN, GERMANY

APPARATUS FOR MEASURING THE OUTPUT OF REFRIGERATING MACHINES

Application filed January 6, 1927, Serial No. 159,474, and in Germany July 21, 1926.

My invention relates to a flow meter, particularly for measuring the output of refrigerating machines. It is an object of my invention to so perform the measuring operation that the errors involved in old methods are eliminated. Such errors may be caused by the presence of steam or air bubbles, oil or any other impurities in the liquid to be evaporated, and means are provided according to my invention by which the purity of the liquid is readily tested and impurities are detected.

In a preferred embodiment of my invention, I illuminate the liquid in the indicator and provide a glass for inspecting it as it flows through the apparatus.

It is necessary to supervise the output of refrigerating machines, as leakage and loss of refrigerating agent from the system may occur, or mechanical defects, worn-out piston rings, leaky valves, etc., may develop, by which troubles the output is reduced.

It has already been proposed to supervise the output of the machine by measuring the liquid from the condenser by a perforated plate (Poncelet plate) intermediate two superimposed tanks, and to read the output at a given time from a table, after gauging the liquid levels in the tanks. It has also been proposed to measure the pressures on both sides of a perforated plate by pressure gauges and to calculate the output from the indications of such gauges.

Apparatus of the first-mentioned type involve the drawback that steam and liquid are in the same tank and the temperature of the liquid is nearly at boiling point so that liquid may permanently be evaporated, or steam condensed, and it is difficult to obtain uniform conditions. In apparatus of the last-mentioned type measuring may become impossible due to steam flowing through the perforated plate instead of liquid.

These drawbacks are overcome by permitting only pure liquid to be supplied to the perforated plate so that errors due to steam bubbles and other foreign matter are eliminated. The flow is measured by a differential gauge and the output at any given time may be read on a scale combined with the pressure scale of the gauge.

The purity of the liquid flowing toward the perforated plate, that is, its freedom from steam or air bubbles, oil, etc., is tested through a gauge glass which may be combined with a lamp. In a preferred embodiment of my invention, I provide in the vicinity of the gauge glass and in the passage in front of the perforated plate, a small incandescent lamp which is insulated from the liquid and illuminates the entire area of the passage. When the liquid is pure the space behind the inspection glass appears to be empty, but when steam bubbles have been carried along with the liquid (the Tyndall phenomenon) or the liquid contains any other impurities, air, oil or the like, these will become visible in the light of the lamp even if very finely distributed.

Obviously, it is important that the entire area of the flowing liquid should be pervaded by the light rays.

In the drawings an indicator by which my method may be performed, is illustrated by way of example.

Fig. 1 is an elevation of a complete flow meter,

Fig. 2 is a section of the flow meter in a plane containing the axis of its supply pipe, Fig. 3 is an elevation of the flow meter drawn to a larger scale and partly broken open, Fig. 4 is a section on the line IV—IV in Fig. 3, with the two-way cock $k$ in a different position, Figs. 5 and 6 are sections similar to the sectional part in Fig. 3 and showing modified means for illuminating the inspecting means.

Referring now to the drawings, $a$ is the supply pipe of the indicator which is provided with flanges at both ends and is adapted to be inserted in the pipe line, not shown, of a refrigerating machine. The liquid, generally ammonia, flows as indicated by the arrows in Figs. 1 and 3. $b$ is a thermometer in the supply pipe $a$ which extends into the flowing liquid, $d$ is a casing integral with, or secured to the supply pipe $a$, $c$ and $h$ are parallel passages in the casing which are connected with the passage in the supply pipe *a* at their lower ends, and with each other at their upper ends. *e* is an inspection glass in the wall of the passage *c* where any impurities in the liquid are detected and remedied by the operator. Therefore, only pure liquid will flow in the apparatus. *f* is a perforated plate extending across the passage *c* and *o* and *p* are passages connected with the spaces above and below the plate. The passages are connected with pipes *m* and *n*, respectively which convey the liquid to a differential gauge *g*. *l* is a face on the casing *d* to which the gauge *g* may be secured. *q* is a sleeve inserted above the plate *f* and *r* is the cover of the casing *d* by which the plate *f* is held on a shoulder of the passage *c* through the medium of the sleeve *q*. *s* is a hole in the upper portion of the sleeve by which the passage *c* is connected with the passage *h*. From this passage the liquid flows to the shut-off valve *i* and on to the machine. The valve *i* is set for a given output.

*k* is a two-way cock at the ends of the passages *c* and *h* where they adjoin the passage in the supply pipe *a* and serves for by-passing the casing *d*. When the casing is by-passed the liquid in it is shut off from the supply pipe *a* and might cause damage to the casing or the parts connected therewith as it has no exit. To prevent trouble of this kind, bores *o'* and *p'* are provided in the body of the two-way cock *k* which are connected with cavities at the front and the rear of the cock so that the cock will be moved from its seat by axial thrust in the case of excess pressure, and damage to the casing is prevented. A spring *y* holds the valve *k* on its seat and is arranged about the valve spindle *z*. The central web of the valve is shown in cross section at *q* for the sake of clearness. Besides, a gauge might be secured to the cover *r* for indicating the pressure in the casing *d*.

*g'* is an incandescent lamp inserted in the wall of the passage *c*, and *h'* is a glass cover surrounding the lamp. The light of the lamp pervades the entire area of the flowing liquid. By arranging the lamp on one side of the glass *e* the liquid becomes distinctly visible in the light and the presence of any undesirable admixtures or impurities is readily detected.

In some cases, a less complicated arrangement of the lamp will suffice, and examples are illustrated in Figs. 5 and 6. A glass plate *u* may be inserted in the wall of the passage *c* and a lamp *v* may be arranged in front of the plate, and project its rays onto a collector lens *w* or a reflector *x*, as shown in Figs. 5 and 6, respectively, which directs them into the flowing liquid. In this case, however, a comparatively weak light will be obtained which does not extend all over the area of the liquid, but, as said, this simpler device may be used in some cases. The problem is to illuminate the flowing liquid so that undesirable admixtures will readily be detected.

Let F be the area of the perforated plate, $\Delta p$ the difference of pressures on both sides of the plate, $\mu$ the contraction coefficient—which is found by calibration—and $\gamma$ the specific gravity of the liquid, then the weight of the liquid flowing through the plate *f* is:

$$F\mu\sqrt{2g\Delta p\gamma}$$

This is the quantity of liquid which gets into the evaporator of the refrigerating machine and from which the output is readily ascertained as the heat of evaporation for the unit weight of liquid is given.

*s'* is the pressure scale of the gauge *g*, and *t* is an additional scale on which the output is plotted. For the normal temperature of ammonia, 12 deg. centigrade, the output may be read directly. For any other temperature of the liquid which the thermometer *b* indicates, the latent heat of the liquid will be different in accordance with the specific gravity of the liquid, and the output will vary in proportion. An additional scale may be provided for making the necessary connection so that the output may be read for these temperatures as well.

It will be understood that in this manner the output at a given time is readily and reliably ascertained.

I claim:

1. In a refrigerating machine flow meter for the evaporating medium, the combination of a vertical pipe having a restriction therein and an inspection glass opening in the wall thereof in advance of said restriction, the wall of said pipe having another opening therein, and an illuminating device arranged to throw light through the last named opening into the interior of the pipe normally to the optical axis of said inspection glass.

2. In a refrigerating machine flow meter for the evaporating medium, the combination of a vertical pipe having a restriction therein and an inspection glass opening in the wall thereof in advance of said restriction, the wall of said pipe having another opening therein, a collecting lens in the last mentioned opening, and illuminating means arranged with the collecting lens to throw light rays through said last named opening into the interior of the pipe normally to the axis of said inspection glass.

3. In a refrigerating machine flow meter for the evaporating medium, the combination of a vertical pipe of opaque material having a restriction therein and an inspection glass opening in the wall thereof in advance of said restriction, the wall of said pipe having another opening therein, and an illuminating device arranged to throw light through the last named opening into the interior of the pipe normally to the optical axis of said inspection glass.

4. In a refrigerating machine flow meter for the evaporating medium, the combination of a vertical pipe and a conduit for supplying medium to and discharging medium from said pipe, a valve controlling communication between the conduit and pipe, means constituted in part by said valve for relieving the pressure of the medium in said pipe when the valve is adjusted to interrupt communication between the conduit and pipe, said pipe having a restriction therein and an inspection glass in the wall thereof in advance of the restriction, the wall of said pipe having another opening therein, and an illuminating device arranged to throw light through the last named opening into the interior of said pipe normally to the axis of the inspection glass.

In testimony whereof, I have signed my name to this specification.

FRIEDRICH SCHIPPER.